US006178255B1

(12) United States Patent
Scott et al.

(10) Patent No.: US 6,178,255 B1
(45) Date of Patent: Jan. 23, 2001

(54) INDIVIDUALIZED FINGERPRINT SCANNER

(75) Inventors: Walter Guy Scott, North Palm Beach; Dean J. Fedele, Jupiter, both of FL (US)

(73) Assignee: Cross Match Technologies, Inc., Palm Beach Gardens, FL (US)

( * ) Notice: Under 35 U.S.C. 154(b), the term of this patent shall be extended for 0 days.

(21) Appl. No.: 09/067,792

(22) Filed: Apr. 28, 1998

(51) Int. Cl.$^7$ ..................................................... G06K 9/00

(52) U.S. Cl. ........................... 382/124; 356/71; 382/127

(58) Field of Search ................................... 382/124–127; 356/71

(56) References Cited

U.S. PATENT DOCUMENTS

| | | | |
|---|---|---|---|
| D. 348,445 | 7/1994 | Fishbine et al. | D14/107 |
| D. 351,144 | 10/1994 | Fishbine et al. | D14/107 |
| 2,500,017 | 3/1950 | Altman | 88/57 |
| 3,200,701 | 8/1965 | White | 88/14 |
| 3,482,498 | 12/1969 | Becker | 95/12 |
| 3,527,535 | 9/1970 | Monroe | 356/71 |
| 3,617,120 | 11/1971 | Roka | 353/28 |
| 3,947,128 | 3/1976 | Weinberger et al. | 356/71 |
| 3,968,476 | 7/1976 | McMahon | 340/146.3 E |
| 4,063,226 | 12/1977 | Kozma et al. | 365/125 |
| 4,210,899 | 7/1980 | Swonger et al. | 340/146.3 E |
| 4,414,684 | 11/1983 | Blonder | 382/4 |
| 4,537,484 | 8/1985 | Fowler et al. | 354/62 |
| 4,544,267 | 10/1985 | Schiller | 356/71 |
| 4,681,435 | 7/1987 | Kubota et al. | 356/71 |
| 4,792,226 | 12/1988 | Fishbine et al. | 356/71 |
| 4,811,414 | 3/1989 | Fishbine et al. | 382/52 |
| 4,876,726 | 10/1989 | Capello et al. | 382/4 |
| 4,924,085 | 5/1990 | Kato et al. | 250/227.28 |
| 4,933,976 | 6/1990 | Fishbine et al. | 382/4 |
| 4,995,086 | 2/1991 | Lilley et al. | 382/4 |
| 5,054,090 | 10/1991 | Knight et al. | 382/4 |
| 5,067,162 | 11/1991 | Driscoll, Jr. et al. | 382/5 |
| 5,067,749 | 11/1991 | Land | 283/117 |
| 5,131,038 | 7/1992 | Puhl et al. | 380/23 |

(List continued on next page.)

FOREIGN PATENT DOCUMENTS

| | | | |
|---|---|---|---|
| 41 25 198 C1 | 5/1992 | (DE) | G06K/19/073 |
| 0 101 772 A1 * | 3/1984 | (EP) . | |
| 0 308 162 | 3/1989 | (EP) | A61B/5/10 |
| 0 379 333 A1 * | 7/1990 | (EP) . | |
| 0 379 333 B1 * | 7/1995 | (EP) . | |
| 0 905 646 A1 * | 3/1999 | (EP) | G06K/11/18 |
| 2 089 545 | 6/1982 | (GB) | G06K/9/20 |
| WO 87/02491 | 4/1987 | (WO) | G07C/9/00 |
| WO 90/03620 | 4/1990 | (WO) | G06K/9/20 |
| WO 92/11608 | 7/1992 | (WO) | G06K/9/00 |
| WO 94/22371 | 10/1994 | (WO) | A61B/5/117 |
| WO 96/17480 | 6/1996 | (WO) | H04N/13/93 |
| WO 97/29477 | 8/1997 | (WO) | G09G/5/08 |
| WO 98/12670 | 3/1998 | (WO) | G07C/9/00 |
| WO 99/12123 * | 3/1999 | (WO) . | |

OTHER PUBLICATIONS

Btt (Biometric Technology Today), Finger technologies contacts, 2 pages.

Drake, M.D. et al., "Waveguide hologram fingerprint entry device," *Optical Engineering*, vol. 35, No. 9, Sep. 1996, pp. 2499–2505.

(List continued on next page.)

*Primary Examiner*—Bhavesh Mehta
(74) *Attorney, Agent, or Firm*—Sterne, Kessler, Goldstein & Fox, P.L.L.C.

(57) ABSTRACT

A method and apparatus whereby a fingerprint verifier has a mechanism to slide a prism over an imaged area of a camera. The position of the prism being determined by a binary absolute linear code on a sliding mechanism imaged by the same camera at the side of the fingerprint wherein the images are knitted together to simulate a large CCD.

4 Claims, 9 Drawing Sheets

U.S. PATENT DOCUMENTS

| | | | |
|---|---|---|---|
| 5,146,102 | 9/1992 | Higuchi et al. | 250/556 |
| 5,187,747 | 2/1993 | Capello et al. | 382/4 |
| 5,222,152 | 6/1993 | Fishbine et al. | 382/2 |
| 5,230,025 | 7/1993 | Fishbine et al. | 382/4 |
| 5,233,404 | 8/1993 | Lougheed et al. | 356/71 |
| 5,249,370 | 10/1993 | Stanger et al. | 34/22 |
| 5,384,621 * | 1/1995 | Hatch et al. | 355/204 |
| 5,416,573 | 5/1995 | Sartor, Jr. | 356/71 |
| 5,467,403 | 11/1995 | Fishbine et al. | 382/116 |
| 5,473,144 | 12/1995 | Mathurin, Jr. | 235/380 |
| 5,517,528 | 5/1996 | Johnson | 375/259 |
| 5,528,355 | 6/1996 | Maase et al. | 356/71 |
| 5,548,394 | 8/1996 | Giles et al. | 356/71 |
| 5,591,949 | 1/1997 | Bernstein | 235/380 |
| 5,596,454 | 1/1997 | Hebert | 359/726 |
| 5,613,014 * | 10/1994 | Eshera et al. | 382/124 |
| 5,615,277 | 3/1997 | Hoffman | 382/115 |
| 5,625,448 | 4/1997 | Ranalli et al. | 356/71 |
| 5,640,422 | 6/1997 | Johnson | 375/259 |
| 5,650,842 | 7/1997 | Maase et al. | 356/71 |
| 5,661,451 | 8/1997 | Pollag | 340/426 |
| 5,680,205 | 10/1997 | Borza | 356/71 |
| 5,689,529 | 11/1997 | Johnson | 375/259 |
| 5,717,777 | 2/1998 | Wong et al. | 382/124 |
| 5,748,766 * | 4/1996 | Masse et al. | 382/124 |
| 5,755,748 | 5/1998 | Borza | 607/61 |
| 5,778,089 | 7/1998 | Borza | 382/124 |
| 5,781,647 | 7/1998 | Fishbine et al. | 382/1 |
| 5,812,067 | 9/1998 | Bergholz et al. | 340/825.31 |
| 5,822,445 | 10/1998 | Wong | 382/127 |
| 5,825,474 | 10/1998 | Maase | 356/71 |
| 5,848,231 | 12/1998 | Teitelbaum et al. | 395/186 |
| 5,859,420 | 1/1999 | Borza | 250/208.1 |
| 5,867,802 | 2/1999 | Borza | 701/35 |
| 5,872,834 | 2/1999 | Teitelbaum | 379/93.03 |
| 5,900,993 | 5/1999 | Betensky | 359/710 |
| 5,907,627 | 5/1999 | Borza | 382/124 |
| 5,920,384 * | 7/1999 | Borza | 356/71 |
| 5,974,162 | 10/1999 | Metz et al. | 382/124 |

OTHER PUBLICATIONS

Roethenbaugh, G. (ed.), *Biometrics Explained*, 1998, ICSA, pp. 1–34.

*Ultra–Scan Corporation Home Page* (visited May 20, 1999) <http://www.ultra–scan.com/index.htm>, 3 pages. (discusses tecnology as early as 1996).

*Profile* (last updated Aug. 16, 1998) <http://www.dermalog.de/Britain/Profile/profile.htm>, 3 pages. (discusses technology as early as 1990).

*ID–Card System Technical Specifications* (last updated Jul. 18, 1998) <http://dermalog.de/Britain/Products/ID–Card/idcard2.htm>, 2 pages.

*Fujitsu Limited Products and Services* (updated Apr. 21, 1999) <http://www.fujitsu.co.jp/hypertext/Products/index–e.html>, 3 pages, Copyright 1995–1999.

*Verid Fingerprint Verification* (visited May 17, 1999) <http://www.tssi.co.uk/products/finger.html>, 2 pages.

*Startek's Fingerprint Verification Products: Fingerguard FG–40* (visited May 18, 1999) <http://www.startek.com.tw/product/fg40/fg40.html>, 3 pages.

*SAC Technologies Showcases Stand–Alone SAC–Remote(TM)* (visited May 18, 1999) <http://www.pathfinder.com/money/latest/press/PW/1998Mar25/1026.html>, 2 pages.

*Mytec Technologies Gateway*, (visited Apr. 27, 1999) <http://www.mytec.com/Products/gateway/>, 1 page.

*Mytec Technologies Gateway: Features & Benefits*, (visited Apr. 27, 1999) <http://www.mytec.com/Products/gateway/features.htm>, 1 page.

*Mytec Technologies Touchstone Pro*, (visited Apr. 27, 1999) <http://www.mytec.com/Products/Touchstone/>, 1 page.

*Mytec Technologies Touchstone Pro: Features*, (visited Apr. 27, 1999) <http://www.mytec.com/Products/Touchstone/features.htm>, 1 page.

*Electronic Timeclock Systems and Biometric Readers* (last updated Apr. 17, 1999) <http://www.lfs–hr–bene.com/tclocks.html>, 1 page.

*Fingerprint Time Clock* (visited May 17, 1999) <http://www.lfs–hr–bene.com/Biometrics/Fingerprintclock.html>, 6 pages.

*KC–901: The KSI fingerprint sensor* (visited May 17, 1999) <http://www.kinetic.bc.ca/kc–901.html>, 3 pages.

*Intelnet Inc.* (visited May 20, 1999) <http://www.intelgate.com/index.html>, 1 page, Copyright 1996.

*Ver–i–Fus Fingerprint Access Control System* (visited May 20, 1999) <http://www.intelgate.com/verifus.htm>, 2 pages. (Ver–i–fus product released in 1995).

*Ver–i–fus® Configurations* (visited May 20, 1999) <http://www.intelgate.com/verconfig.htm>, 1 page. (Ver–i–fus product released in 1995).

*Ver–i–Fus® & Ver–i–Fus$^{mil}$®* (visited May 20, 1999) <http://www.intelgate.com/vif_data.htm>, 3 pages. (Ver–i–fus product released in 1995).

*Access Control System Configurations* (visited May 20, 1999) <http://www.intelgate.com/access.htm>, 2 pages. (Ver–i–fus product released in 1995).

*Company* (visited May 17, 1999) <http://www.instainfo.com.company.htm>, 2 pages.

*TouchLock™ II Fingerprint Identity Verification Terminal* (visited May 17, 1999) <http://www.identix.com/TLock.htm>, 4 pages.

*Physical Security and Staff Tracking Solutions* (visited May 17, 1999) <http://www.identix.com/products/biosecurity.html>, 3 pages, Copyright 1996–1998.

*Veriprint2000 Fingerprint Verification Terminal For Use With Jantek Time & Attendance Software* (visited May 17, 1999) <http://www.hunterequipment.com/fingerprint.htm>, 2 pages.

*Veriprint 2100 Stand–Alone Fingerprint Verification Terminal* (visited Apr. 27, 1999) <http://www.biometricid.com/veriprint2100.htm>, 3 pages.

*The DERMALOG Check–ID* (visited Nov. 12, 1999) <http://www.dermalog.de/ganzneu/products_check.html>, 1 page.

*Startek's Fingerprint Verification Products: FingerFile 1050* (visited Oct. 8, 1999) <http://www.startek.com.tw/product/ff1050/ff1050.html>, 3 pages.

*Time is Money!* (visited Jun. 5, 1998) <http://www.iaus.com/afim.htm>, 3 pages.

*LS 1 LiveScan Booking Workstation High Performance Finger & Palm Scanning System* (visited Jun. 4, 1998) <http://www.hbs–jena.com/ls1.htm>, 6 pages, Copyright 1998.

*Welcome to the Homepage of Heimann Biometric Systems GMBH* (visited Jun. 4, 1998) <http://www.hbs–jena.com/>, 1 page, Copyright 1998.

*Heimann Biometric Systems Corporate Overview* (visited Jun. 4, 1998) <http://www.hbs–jena.com/company.htm>, 4 pages, Copyright 1998.

*Remote Access Positive IDentification—raPID* (visited Jun. 3, 1998) <http://www.nec.com . . . >, 2 pages, Copyright 1997.
*Morpho DigiScan Cellular* (visited Jun. 3, 1998) <http://www.morpho.com/products/law_enforcement/digiscan/cellular.htm>, 2 pages, Coopyright 1998.
*A.F.I.S.* (last updated Apr. 4, 1998) <http://www.dermalog.de/afis.htm>, 2 pages.
*Morpho FlexScan Workstation* (visited Jun. 3, 1998) <http://www.morpho.com/products/law_enforcement/flexscan/>, 2 pages, Copyright 1998.
True–ID® The LiveScan with special "ability" . . . , 2 pages.
*Printrak International: User List* (visited Jun. 3, 1998) <http://www.printrakinternational.com and links>, 10 pages, Copyright 1996.
*Live–Scan Products: Tenprinter® 1133S* (visited Apr. 23, 1999) <http://www.digitalbiometrics.com/Products/tenprinter.htm>, 4 pages. (Tenprinter 1133S released in 1996).
*TouchPrint™ 600 Live–Scan System* (visited Apr. 23, 1999) <http://www.identix.com/products/livescan.htm>, 4 pages, Copyright 1996–1998.
Systems for Live–Scan Fingerprinting, Digital Biometrics, Inc., 8 pages, Copyright 1998.
DBI FingerPrinter CMS, Digital Biometrics, Inc., 5 pages. (CMS released in 1998).
Verid Fingerprint Reader, TSSI, 4 pages.
Copy of International Search Report for PCT/US99/09166, 2 pages.
*Startek's Fingerprint Verification Products* (visited Nov. 17, 1999) <http://www.startek.com.tw/product/index.html>, 1 page.
*Introduction to Startek's Fingerprint Verification Products* (visited Nov. 17, 1999) <http://www.startek.com.tw/product/index2.html>, 2 pages.
*Automatic Fingerprint Identification Systems* (visited Nov. 17, 1999) <http://www.sagem.com/en/produit4–en/empreinte–dig–en.htm>, 1 page.
*Digital Biometrics Corporate Information* (visited Nov. 17, 1999) <http://www.digitalbiometrics.com/Corporate_info/Corporate_info.htm>, 2 pages. (Discusses technology as early as 1985).
*DBI Live–Scan Products: Digital Biometrics Tenprinter* (visited Nov. 17, 1999) <http://www.digitalbiometrics.com/products/tenprinter.htm>, 4 pages. (Tenprinter released in 1996).
*DBI Live–Scan Products: Networking Options* (visited Nov. 17, 1999) <http://www.digitalbiometrics.com/products/networking_options.htm>, 3 pages.
*DBI Live–Scan Products: Digital Biometrics FingerPrinter CMS* (visited Nov. 17, 1999) <http://www.digitalbiometrics.com/products/FingerPrinterCMS.htm>, 3 pages. (CMS released in 1998).
*DBI Live–Scan Products: Image Printer Stations* (visited Nov. 17, 1999) <http://www.digitalbiometrics.com/products/imageprinter.htm>, 2 pages.
*DBI Live–Scan Products: FC–21 FingerPrint Capture Station* (visited Nov. 17, 1999) <http://www.digitalbiometrics.com/products/Fingerprintcapture.htm>, 2 pages.
*Series 400 OEM Scanner* (visited Nov. 17, 1999) <http://www.ultra–scan.com/400.htm>, 3 pages. (Scanner released in 1996).
*USC Scanner Design* (visited Nov. 17, 1999) <http://www.ultra–scan.com/scanner.htm>, 4 pages. (Scanner released in 1996).

*Series 500/600 Scanners* (visited Nov. 17, 1999) <http://www.ultra–scan.com/500.htm>, 3 pages. (Scanner released in 1996).
*Series 700 ID Station* (visited Nov. 17, 1999) <http://www.ultra–scan.com/700.htm>, 3 pages. (Scanner released in 1998).
*Identix: The Corporation* (visited Nov. 17, 1999) <http://www.identix.com/corporate/home.htm>, 2 pages, Copyright 1996–1998.
*Biometric Imaging Products* (visited Nov. 17, 1999) <http://www.identix.com/products/bioimage.htm>, 1 page, Copyright 1996–1998.
*TouchPrint™ 600 Live–Scan System* (visited Nov. 17, 1999) <http://www.identix.com/products/livescan.htm>, 4 pages, Copyright 1996–1998.
*TouchPrint™ 600 Palm Scanner* (visited Nov. 17, 1999) <http://www.identix.com/products/palmscan.htm>, 3 pages, Copyright 1996–1998.
*TouchPrint™ 600 Card Scan System* (visited Nov. 17, 1999) <http://www.identix.com/products/cardscan.htm>, 3 pages, Copyright 1996–1998.
*Dermalog Key—The safest and easiest way of access control* (Last updated Jul. 18, 1998) <http://www.dermalog.de/Britain/Products/Key/key.htm>, 1 page.
*Dermalog Finger–ID Your small size solution for high security* (Last updated Jul. 18, 1998) <http://www.dermalog.de/Britain/Products/Finger/fingerid.htm>, 1 page.
*Mytec: Corporate* (visited Nov. 17, 1999) <http://www.mytec.com/corporate/>, 2 pages.
*Kinetic Sciences Inc. Fingerprint Biometrics Division* (visited Nov. 17, 1999) <http://www.kinetic.bc.ca/main–FP-B.html>, 1 page.
*Pollex Technology Ltd., The Expert in Fingerprint Identification—POLLog* (visited Nov. 17, 1999) <http://www.pollex.ch/english/products/pollog.htm>, 2 pages.
*Sony Fingerprint Identification Terminal* (visited Nov. 17, 1999) <http://www.iosoftware.com/biosols/sony/fiu/applications/fit100.htm>, 2 pages.
*Sony Fingerprint Identification Unit* (visited Nov. 17, 1999). <http://www.iosoftware.com/biosols/sony/fiu/index.htm>, 3 pages.
*Fujitsu Fingerprint Recognition Device (FPI–550)* (visited Nov. 17, 1999) <http://www.iosoftware.com/biosols/fujitsu/fpi550.htm>, 2 pages.
*Mitsubishi MyPass LP–1002* (visited Nov. 17, 1999) <http://www.iosoftware.com/biosols/mitsubishi/mypass.htm>, 2 pages.
*SecureTouch PV—A Personal Password Vault* (visited Nov. 17, 1999) <http://www.biometricaccess.com/securetouch_pv.htm>, 1 page.
*Digital Descriptor Systems, Inc.—Profile* (visited Nov. 17, 1999) <http://www.ddsi–cpc.com/pages/profile.html>, 3 pages.
*Press Release: Printrak International Announces New Portable Fingerprint ID Solution*, Dec. 10, 1996, (visited Nov. 17, 1999) <http://www.scott.net/˜dg/25.htm>, 3 pages.
*Corporate Profile* (visited Nov. 17, 1999) <http://www.printrarkinternational.com/corporate.htm>, 1 page.
*Printrak Products* (visited Nov. 17, 1999) <http://www.printrakinternational.com/Products.htm>, 1 page. (Discusses technology as early as 1974).
Verifier™ 200 Fingerprint Capture Devices, Cross Match Technologies, Inc., 2 pages, 1996–1997.

Verifier 200 Direct Fingerprint Reader, Cross Check Corporation, 2 pages, 1996–1997.

Verifier™ 250 Fingerprint Capture Devices, Cross Match Technologies, Inc., 2 pages, 1996–1997.

Verifier 250 Small Footprint Direct Fingerprint Reader, Cross Check Corporation, 2 pages, 1996–1997.

Verifier™ 290 Fingerprint Capture Devices, Cross Match Technologies, Inc., 2 pages, 1996–1997.

Verifier 290 Direct Rolled Fingerprint Reader, Cross Check Corporation, 2 pages, 1996–1997.

Verifier™ 500 Fingerprint Capture Devices, Cross Match Technologies, Inc., 2 pages, 1998.

Biometric terminal, 1 page.

10–Print Imaging System, Cross Check Corporation, 2 pages, 1998.

*Cross Match Technologies, Inc.* (visited Mar. 25, 1999) <http://www.crossmatch.net/, 1 page.

*Cross Match Technologies, Inc.—Products Overview* (visited Mar. 25, 1999) <http://www.crossmatch.net/new/products/product–index.html>, 1 page.

*Cross Match Technologies, Inc.—Law Enforcement Systems* (visited Mar. 25, 1999) <http://www.crossmatch.net/new/law/law–index.html>, 2 pages.

*Cross Match Technologies, Inc.—Commercial Systems: Building On The Standard* (visited Mar. 25, 1999) <http://www.crossmatch.net/new/commercial/commercial–index.html>, 2 pages.

*Cross Match Technologies, Inc.—International Sales* (visited Mar. 25, 1999) <http://www.crossmatch.net/new/sales/sales–index.html>, 1 page.

*Cross Match Technologies, Inc.—International Sales* (visited Mar. 25, 1999) <http://www.crossmatch.net/new/support/support–index.html>, 1 page.

*Cross Match Technologies, Inc.—News—Press Releases—Verifier 400 Press Release* (visited Mar. 25, 1999) <http://www.crossmatch.net/new/news/news–pr–050798.html>, 1 page.

* cited by examiner

FIG.2

INDIVIDUALIZED FINGERPRINT SCANNER

FIELD OF THE INVENTION

The instant invention is directed to the field of security control and, in particular, to the electronic acquisition of optical fingerprint images and the accurate and repeatable storage thereof.

BACKGROUND OF THE INVENTION

Prior art techniques for obtaining fingerprints have included application of ink to a person's fingertips and rolling or simply pressing the tips of the individual's fingers to appropriate places on a recording card. This system has severe limitations, the least of which is the use of ink which can often require several attempts before a usable image is obtained. Furthermore, use of an ink-based system requires cooperation of the individual from whom the prints are being taken, since blurring and smearing of the prints often occurs when attempts are made to obtain fingerprints from a hostile individual. Additionally, it is difficult to easily adapt inked prints for computerized storage and retrieval; thus making it difficult for various governmental agencies to reliably transfer and share data.

Several attempts have been made to optically acquire fingerprint images, however known systems have various drawbacks. In order to record data correctly, it is necessary to utilize trained personnel to aid the individual in guiding his/her fingers over the optical reading area. The fingers must be accurately positioned and the rate of rotation of the fingers must not exceed the recording abilities of the device. If the fingers are not rotated at the correct speed, data will be lost necessitating repeating of the entire procedure.

Several of these systems generate an optical image in real time, but they suffer from errors caused by their need to approximate the complete fingerprint image by electronically combining a plurality of smaller images or "slices" and smoothing the edges of the slices together to form an image which has the appearance of a full fingerprint. In performing the smoothing operation, a composite image is created which averages the data contained in the adjacent image slices, discarding discontinuities and artifacts so as to arrive at what can be described as a "best guess" image.

Improvements on this so-called "best guess" scenario have sought to provide overlapping slices wherein the image is formed by generating a composite array as a mathematical function of a comparison and an average of the overlapping data which constitutes the overlapping portions of adjacent slices. While this method more accurately characterizes transitions between the boundaries of adjacent image slices, the averaging of discontinuities and discarding of artifacts continues to prevent the obtention of images having the desired degree of accuracy and resolution. Such images still engender a degree of inaccuracy which, when coupled with the limits of resolution and recording inherent in the available hardware, render them unacceptable.

U.S. Pat. No. 4,933,976 discloses a method for generating data characteristic of a rolled fingerprint image. The method requires storing arrays of digital data characteristic of adjacent and overlapping fingerprint images of portions of the finger as the finger is rolled across an optical device, the optical device capturing the image and generating a composite array of digital data characteristic of a rolled fingerprint image as a mathematical function of overlapping image portions of the fingerprint.

What is lacking in the art is a method and apparatus for reliably recording accurate high resolution electronic optical images of fingerprints without the necessity of adhering to critical sampling procedures. Such an invention would enable an untrained individual to accurately record fingerprint images which do not inherently contain unacceptable errors due to averaging of the image while processing.

SUMMARY OF THE INVENTION

The present invention is an improved method and apparatus for acquiring a high resolution electronic optical image of fingerprints. These images are then stored and indexed in a database which can be readily accessed by governmental agencies such that an individual can be easily identified. The invention employs the concept of moving a fingerprint over a viewing area and knitting the image together, in accordance with a simultaneously scanned and uniquely designed bar code.

By utilizing the bar code as a caliper, it is now possible to accurately and repeatable record and store high resolution optical images of fingerprints with no apparent loss of accuracy owing to the electronic knitting process. The caliper enables the microprocessing device to positively identify and organize each of the individual slices which make up the final image. It then becomes possible for an individual to rotate their fingertip in a back and forth motion, without concern for rotation speed, until such time as the device acquires accurate data for all of the required slices. The microprocessing device is then able to reassemble the recorded data by matching said data to the particular segments delineated by the fixed caliper gradations, and knitting the appropriate slices together so as to form a complete image of the fingerprint with minimal loss of resolution.

Thus, it is an objective of the present invention to provide a method and apparatus whereby an untrained individual can accurately record electronic optical images of their fingerprints.

An additional objective of the present invention is to provide a method and apparatus whereby a fingerprint verifier has a mechanism to slide a prism over an imaged area of a camera. The position of the prism being determined by a binary absolute linear code on a sliding mechanism imaged by the same camera at the side of the fingerprint wherein the images are knitted together to simulate a large CCD.

It is an additional objective of the invention to provide a method and apparatus whereby individual segments of data, having the attributes of portions of the image of a fingertip, may be accurately recorded in a random fashion and then reassembled so as to produce an accurate and coherent image of the original fingerprint.

Still another objective of the invention is to provide an apparatus that will operate in two modes, a) Roll print and b) 4 finger flat (which covers two thumbs).

Yet still another objective of the invention is to provide an apparatus that does not have a real time element allowing a user to roll as fast or as slow as they feel comfortable.

Another objective of the invention is to provide an apparatus whereby the individual drives the scanner mechanism, thereby eliminating the cost of a motor or the like drive mechanism for moving fingers over the scanner, or the scanner past the fingers.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 2 is a conventional fingerprint card;

DESCRIPTION OF THE PREFERRED EMBODIMENT(S)

Although the invention will be described in terms of a specific embodiment, it will be readily apparent to those skilled in this art that various modifications, rearrangements and substitutions can be made without departing from the spirit of the invention. The scope of the invention is defined by the claims appended hereto.

Figure 1:
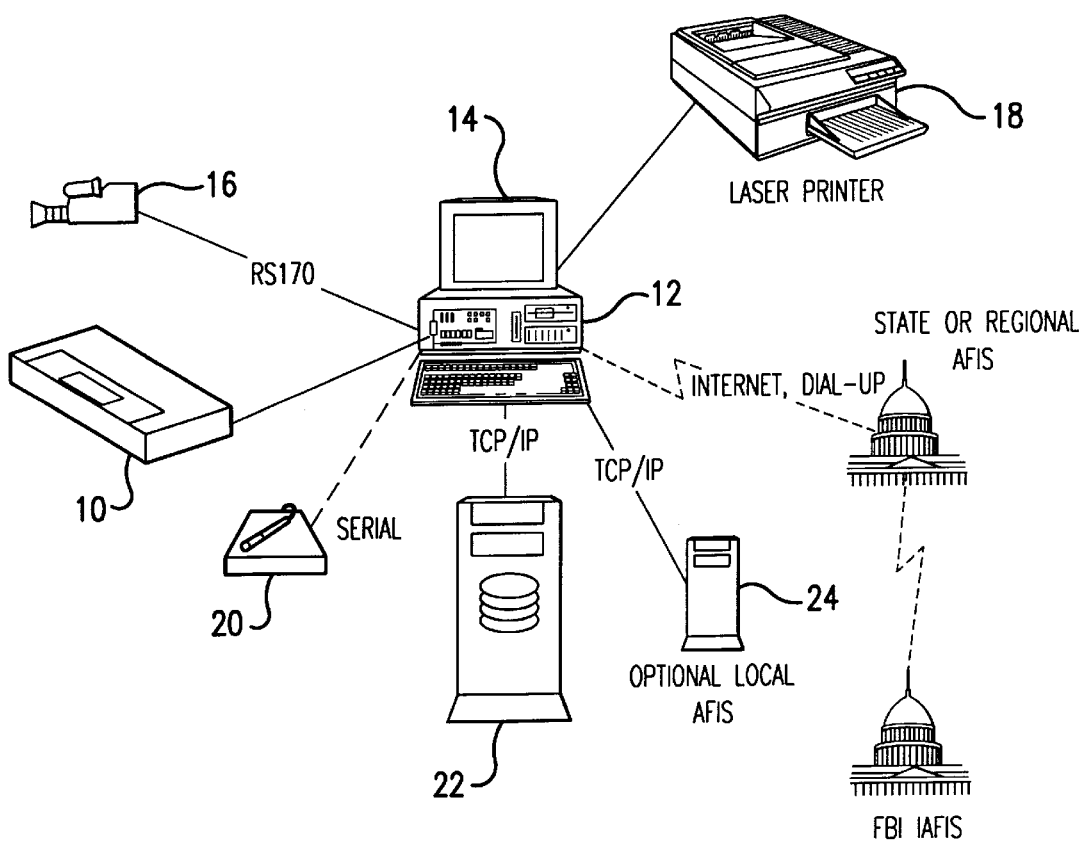
FIG. 1 is a pictorial view of the components and network used by the instant invention.
Figure 3:
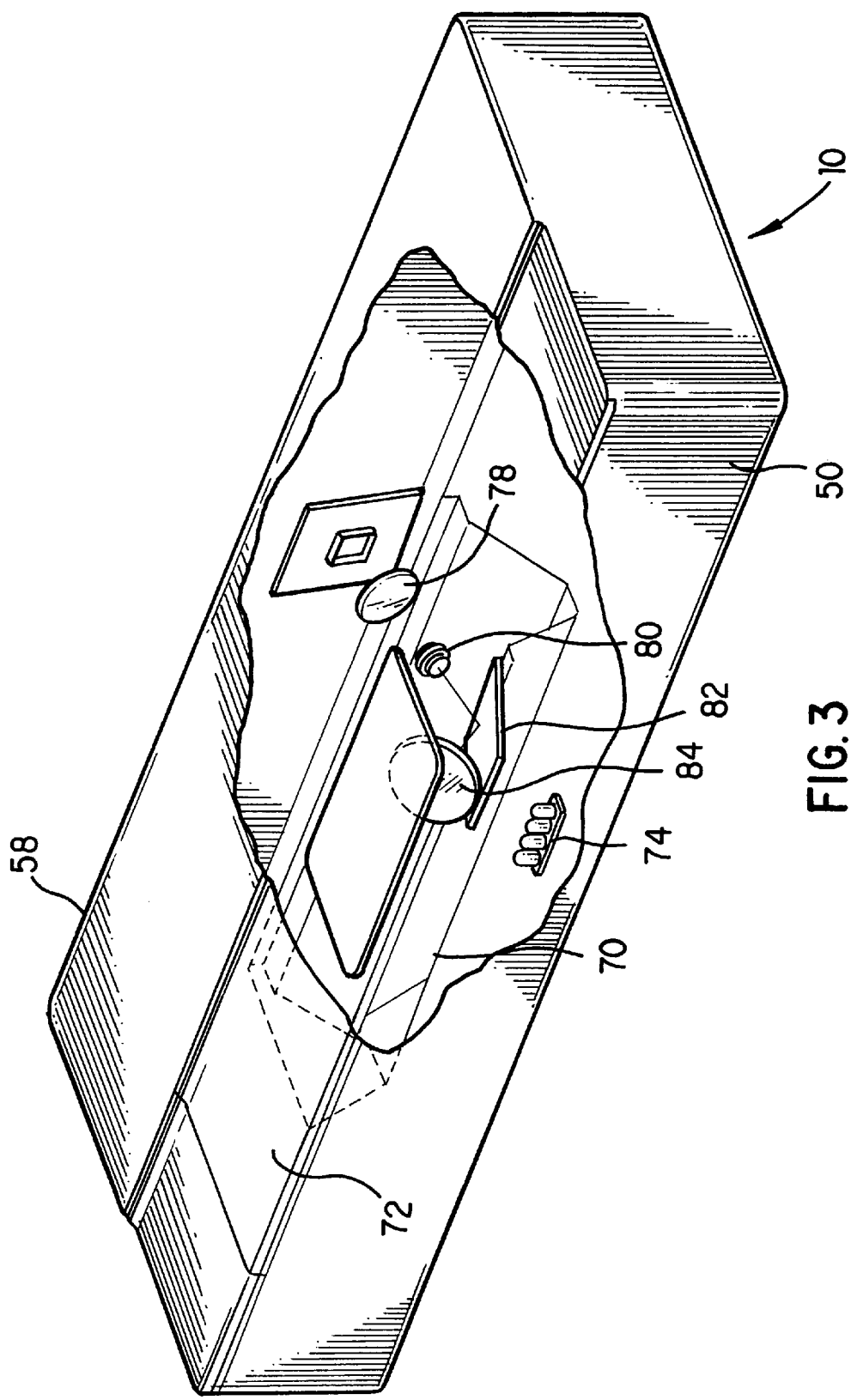
FIG. 3 is a cross sectional view of the fingerprint reader of the instant invention.
Figure 4:
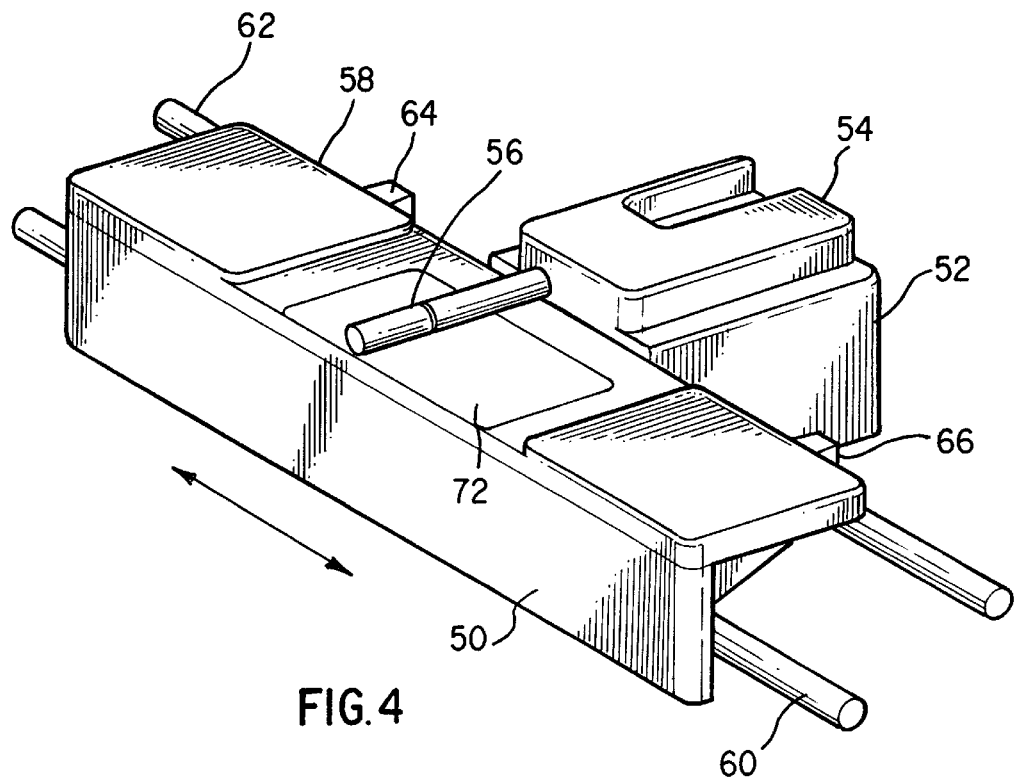
FIG. 4 is a perspective view of the fingerprint reader.
Figure 5:
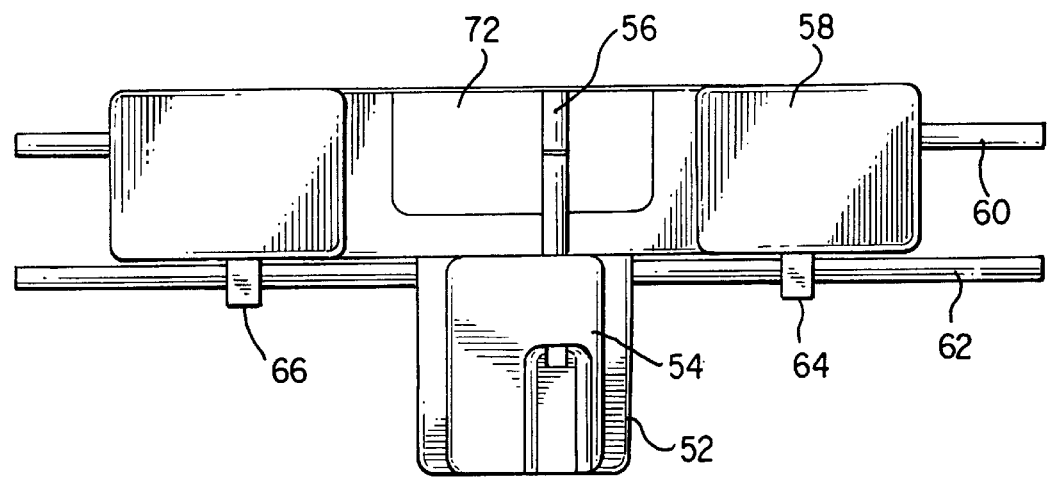
FIG. 5 is a top view of the fingerprint reader.
Figure 6:
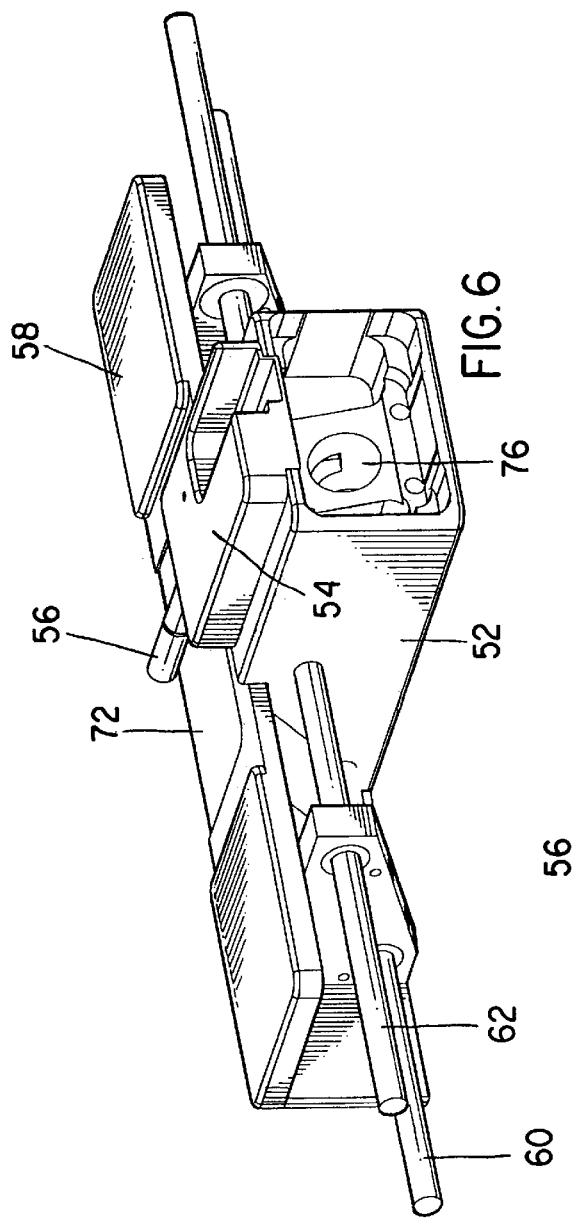
FIG. 6 is a perspective view of a back side of the fingerprint reader.
Figure 7:
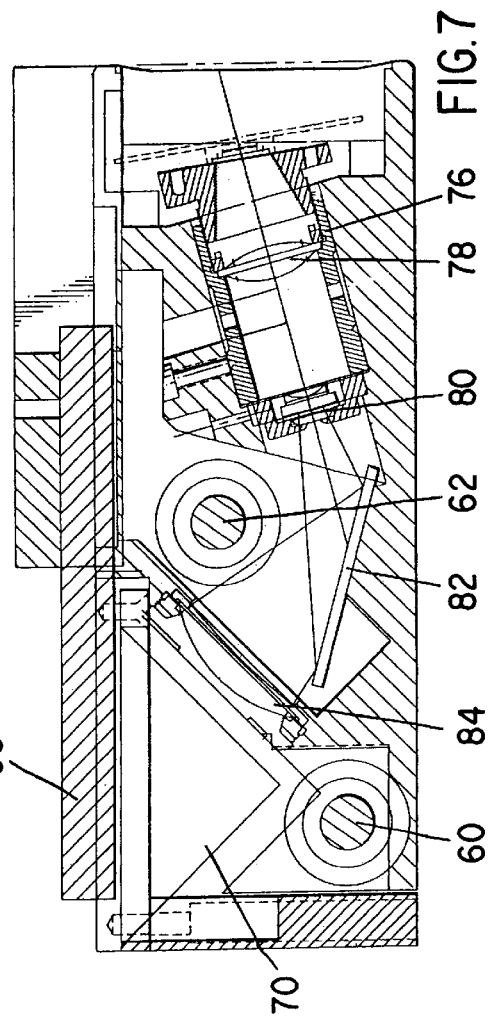
FIG. 7 is a cross sectional side view of the fingerprint reader.
Figure 8:
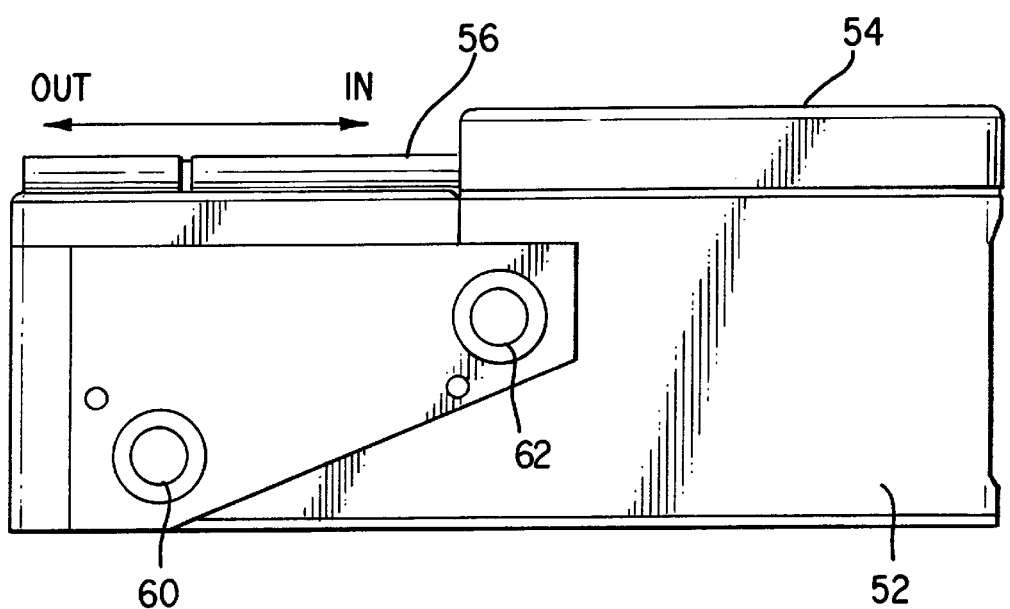
FIG. 8 is a side view of the fingerprint reader.
Figure 9:
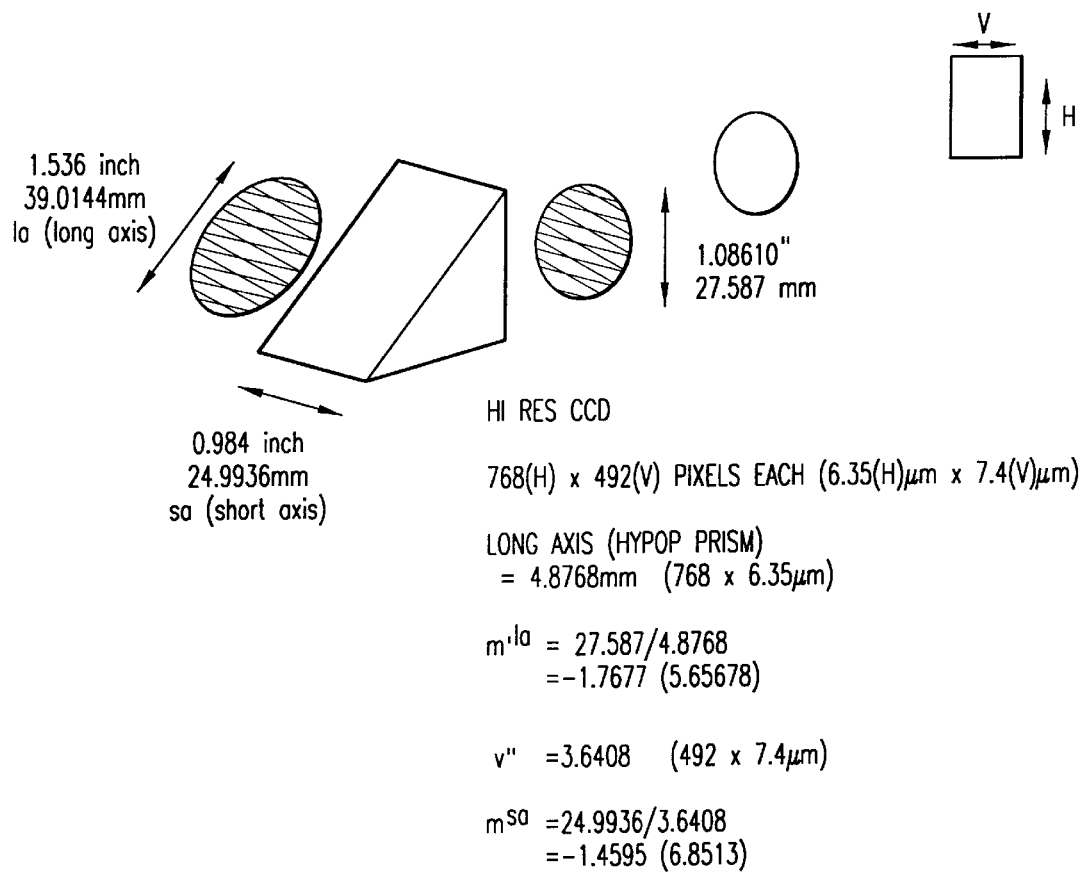
FIG. 9 is a pictorial view of the image process.

Referring now to FIG. 1, set forth is a pictorial of the invention and system comprising a scanner 10 coupled to a computer 12 having a PCI framegrabber board and monitor 14. The system may include a laser printer for local printout. An optional camera 16 may be used for identity verification. In addition, a signature tablet 20 provides another optional identity verification.

The scanner of the instant invention is developed primarily for use by criminal justice systems to collect images of all ten prints of an individual that have been rolled from fingernail to fingernail. The purpose of collecting the prints is to place them in a database 22 where the individual can be recognized (identified). This is termed an AFIS (Automatic Fingerprint Identification System) or IAFIS (Integrated AFIS) system. A local AFIS 24 may also be used for states, cities, courts, or even businesses.

Figure 2:
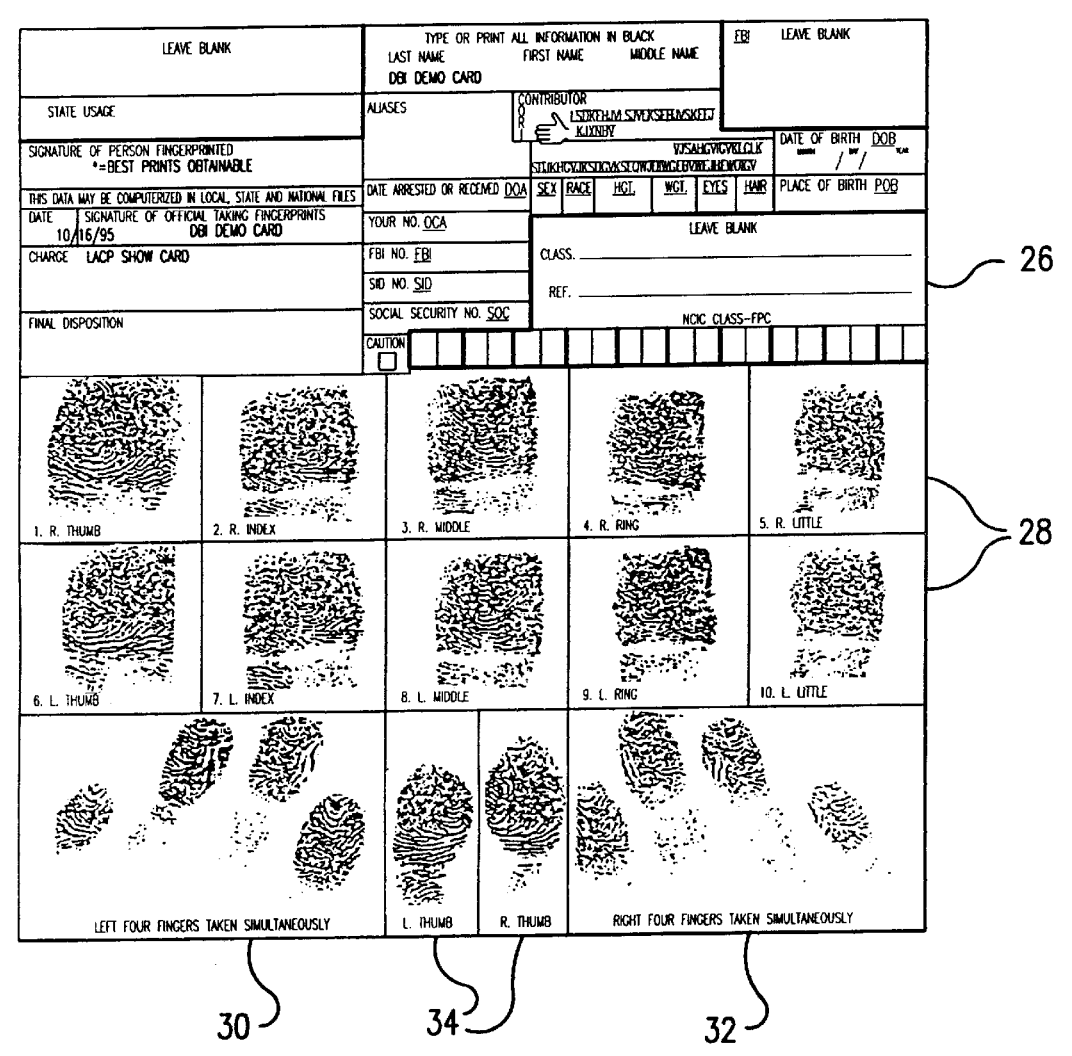

To place the individual in the database so he can be found at a later time, a classification system is used. Each print is classified as a loop arch etc. as defined by the NIS (National Institute of Standards) and stored in order of the finger and its classification. It is thus vital to have the classifications in the correct fingerprint sequence so that the images of both four finger flats and the two thumbs are taken and matched against the rolled prints to ensure sequence. As shown in FIG. 2, a typical fingerprint card 26 includes the individual digits 28 and an image of both four finger flats 30, 32 and the two thumbs 34. This allows a match between the hand and the individual digits.

Existing scanners use either 1 or two platens. One platen of dimensions of 1.5×2 inches is scanned by a 1000 by 800 pixel CCD camera which provides the required 500 dpi resolution specified by the FBI. A second platen of 1.6 to 2 inches by 4 inches is scanned at a lesser resolution to image the four finger flats or by a moving linear CCD to obtain 500 dpi. The costs of the existing 10 print scanners are thus burdened by a 1000×800 pixel CCD, mechanics and maintenance. The instant invention allows a low cost CCD camera to be used to image 1.5 inches by 4 inches of platen at 500 dpi by utilizing the concepts of knitting images using a moving prism.

Referring in general to FIGS. 3–9, the scanner 10 is an electro-optical device preferably housed in a rugged metal box 20 having the approximate dimension of 17 inches wide, 8 inches deep, and 4 inches high. The device can be weighted for secure positioning or affixed to a table top. The scanner 10 is further defined by a scanner body 52 with a finger guide mount 54 located thereon and a roll print finger guide 56. A movable platen assembly 58 slides along guide rods 60, 62 and is supported by platen carriers 64 and 66. The placement of the finger position rod 56 is an outward position as shown allowing for a single finger roll print. The scanner body 52 includes a prism 70 located beneath an optical platen 72. The optical platen will be 1.5 inches by 4 inches active scanning area at 500 dpi with 256 shades of gray and conforming to the FBI requirements. A proximity sensor 74 initiates operation of a CCD or CMOS camera 76 to focus the fingerprint image by use of a first aspheric lens 78, which is directed through a second plastic aspheric lens 80 for reflection off a mirror folding optics 82 for direction through a third plastic aspheric lens 84. The prism 70 operates to change the focal of the fingerprint allowing for ease of interpretation through the CCD or CMOS camera attachment section 76, the camera is not illustrated in this set of figures, as conventionally performed by fingerprint recognition devices. The prism and camera are further described in an application previously filed by the Applicants and pending as U.S. Ser. No. 08/839,934 which is incorporated herein by reference.

In operation, the scanner will operate in two modes, which are different from the current industry protocols. For a roll print, the user will place his finger on the platen 72 next to the roller rod 56 and rotate the finger pressing into the cavity between the rod and glass. There is not a real time element and the user can roll as fast or as slow as they feel comfortable. The platen will accommodate a height of 1.5 inches and a length (circumference) of up to 1.6 inches. The XC DLL will sense the presence and absence of the print to start and stop the process and will knit real time to determine if the finger is rolling and at what speed. The resultant integrated image may be displayed real-time on a VGA screen.

Upon completion of the finger roll the XC DLL2 will extract the minutiae and output a quality level of the print. If the quality level were acceptable a GUI interface will prompt the user for the next print or ask for the roll to be repeated.

After ten roll prints of suitable quality have been collected the procedure moves to flat prints. The operator will move the finger guide 54 to a park position and the user will place his four flat prints on the platen 72 and slide his fingers over the viewing area (easily distinguished by a red glow). The XC DLL will knit the images together into a 4 inch by 1.5 inch image stored as 750×2000 pixels. The XC DLL2 will separate the four fingerprint images and extract and match them to the rolled images to check for sequence. If the matches are acceptable and in the correct sequence the user is prompted for the next hand by the GUI and the acquisition, extraction and matches and sequence checks are repeated. If successful the user is prompted for his two thumbs and the procedure repeated. If successful the 13 images are transferred to the aware software for incorporation into an ISO/ANSII NIST template for storage and/or uploading.

The scanner is coupled to a Graphical User Interface (GUI) and used to acquire a rolled print and output a knitted bitmap 3000 by 3200 pixels with resolution of 2000 dpi in 4196 shades of gray and reduced to 750 by 800 by 256 (DLL1). A flat print is used to acquire and output a bitmap 750 by 2000 pixels with resolution of 500 dpi and 4196 shades of gray and reduced to 256 shades of gray (DLL1). The matter is extracted and reported quality of image to trigger acceptance set in a configuration menu in INI (DLL2). The prints are matched and a report quality of match to trigger acceptance set in a configuration menu in INI (DLL2).

Figure 10:
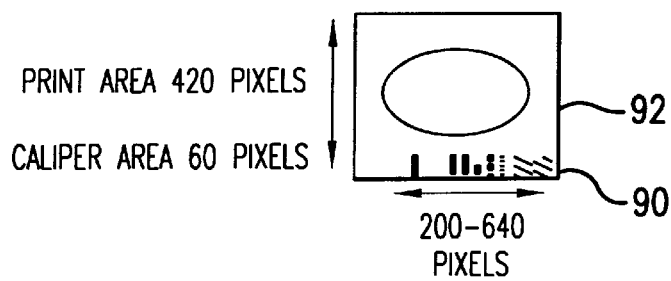
FIG. 10 is pixel illustration.
Figure 11:
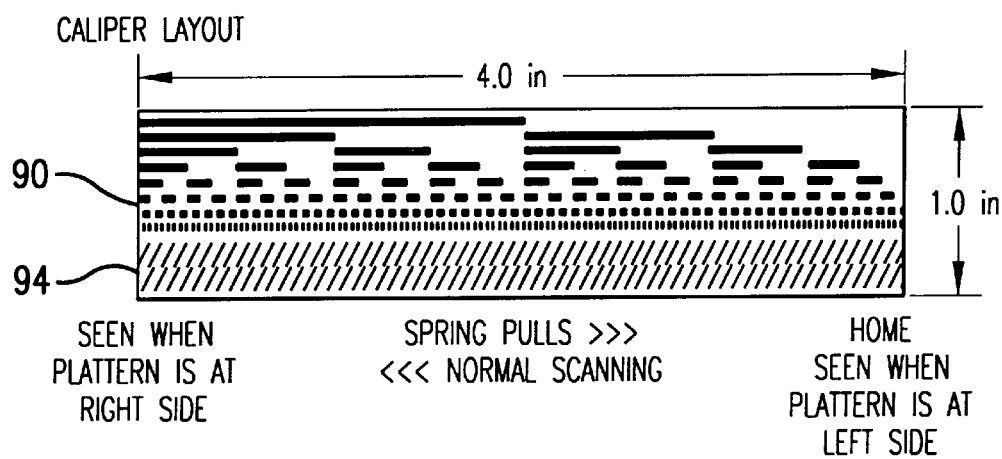
FIG. 11 is an illustration of the caliper layout.
Figure 12:
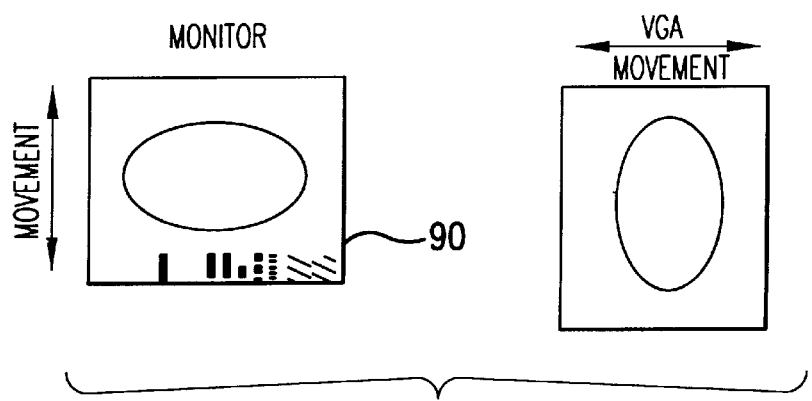
FIG. 12 is a pictorial of the image and layout.

Referring to FIGS. 10–12, the absolute position of a platen is determined by viewing a bar code (herein called the "caliper") attached to the platen. The bar caliper 90 appears at the bottom of the CCD viewing area 92. The CCD image is split with approximately 420 lines for the fingerprint and 60 lines for the caliper. The reference line in the image where the caliper is referenced to is address 450. This gives plus and minus 30 lines to perform its function. The resolution of the optics and CCD are about 3–5 pixels and the brightness and contrast vary the mark space ratios.

Four inches of travel need to be covered with an accuracy of better than a pixel at 500 dpi. Thus 2048 addresses are allocated which would require 12 bits of a binary code. As the resolution of the optics/camera does not permit this resolution a double diagonal is added to determine the least significant bits.

The diagonals cover 32 pixels horizontally and 32 pixels vertically and the second row is offset 16 pixels from the first row. The LSB theory is we search across the video lines 442 thru 460 in the area of the first diagonals saving the x location of the minimum gray scale. We average the x locations that will give us the x location at 450. That value will be the least significant 5 bits of the position. If the position is found to be close to the ends of the diagonal we move to the second row of diagonals to get a better reading.

The MSB theory is we have sufficient resolution to see if a black bar is in its assigned position. If we detect black in the assigned space we have a 1 (one) if we get white we have a zero. The only problem is at the ends of the bars we have an indeterminate gray scale where we need to determine if we are going from black to white or white to black so we know which edge we are on and we can use the least significant bits already determined from the LSB theory to establish which side of the edge we are on. We then scan the area of the binary bars (200,442–500,449) "Area C" and (200,450–500,559) "Area D" for the binary information. A combination of the least significant bits and the gray shade in the areas C and D will determine the binary value.

The value is used to select the useful area and position to place the area of images grabbed during a roll or swipe to create the composite image. The area selected from each image will be centered around line 240 and will be of a width that is half the displacement from the previous image and half the displacement to the next image giving a minimum width to be laid down to minimize skew and possible distortion. A minimum displacement of 4 pixels from the last image is required before an image is qualified to be added. Thus the composite image can be made of slices of images from 8 to 420 pixels wide.

The displayed composite image will be displayed during acquisition to aid the user in its creation and will be rotated in the VGA display. If Black=1 and White=0, when the left side of the caliper target is viewed the caliper reads 2048 right side reads 0. The right side of the caliper target is viewed when the platen is to the left (start position). Target area C and D are defined to determine when the binary bars are going black to white and vice versa and are used in the logic. Target area C is above target area D in the video image and C views an area before D as the image is moved from top down as the platen moves from left to right. Absolute addresses in the bit map are given for clarity but they must be dealt with as parameters that may be changed in calibration procedures.

Figure 13:
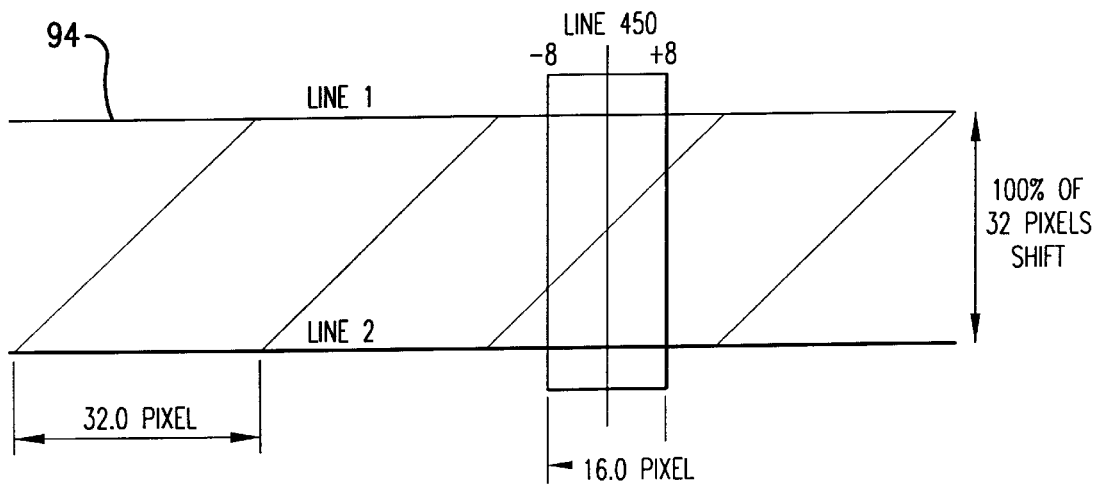
FIG. 13 is a pictorial of the image movement.
Figure 14:
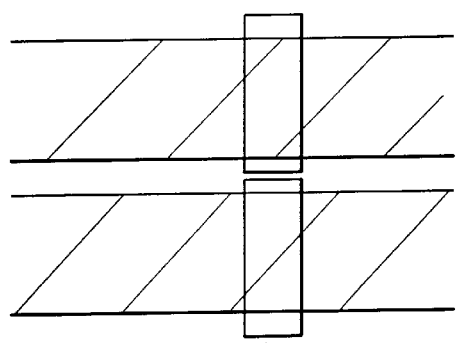
FIG. 14 is an enlarged image of the alignment portion of the caliper layout.

Referring to FIGS. 13–14, the errors in the binary bars are estimated to be removed by the 5 LSB's of the diagonals. The error in the diagonal must be calibrated by finding "line 1"'s X position of transection, the x transection of the diagonal and "line 2"'s X position of transection. The distance between line 1 and line two is 100% of 32 pixels. The position of the diagonal crossing is the ratio of the 32 pixels that is the LSB(5). This will self calibrate. If the transection of the diagonal occurs within say "8 pixels of line 1 or line two the position should be determined from the second row of diagonals.

Process Detail is as follows:

| | |
|---|---|
| 1.0 | Find the lest significant 5 bits |
| 1.01 | find the minim gray level in line 442 from x=500 to x=570 and add the value of x to a temporary sum value "Diag_upper_Sum" |
| 1.02 | repeat 1.01 for lines 441 thru 449 accumulating the sum in "Diag_upper_Sum" |
| 1.03 | find the minim gray level in line 450 from x=500 to x=570 and add the value of x to a temporary sum value "Diag_lower_Sum" |
| 1.03 | repeat 1.03 for lines 451 thru 457 accumulating the sum in "Diag_lower_Sum" |
| 1.04 | divide "Diag_upper_Sum" by 10 and then subtract "Diag_L_Left edge" to get result to get "Diag_upper_average". |
| 1.05 | divide "Diag_lower_Sum" by 10 and then subtract "Diag_L_Left edge" to get result to get "Diag_lower_average". |
| 1.06 | if "Diag_upper_average" or "Diag_lower_average" are not less than 8 or nor greater than 24 sum "Diag_upper_average" and "Diag_lower_average" and divide by 2 and store as "Least_sig_5_Bits". |
| 1.07 | otherwise perform search for "Least_sig_5_Bits" on the second row of diagonals which will be better-centered by:- |

-continued

Process Detail is as follows:

| | |
|---|---|
| 1.08 | find the minim gray level in line 442 from x=580 to x=640 and add the value of x to a temporary sum value "Diag_upper_Sum" |
| 1.09 | repeat 1.01 for lines 441 thru 449 accumulating the sum in "Diag_upper_Sum" |
| 1.10 | find the minim gray level in line 450 from x=580 to x=640 and add the value of x to a temporary sum value "Diag_lower_Sum" |
| 1.11 | repeat 1.03 for lines 451 thru 457 accumulating the sum in "Diag_lower_Sum" |
| 1.12 | divide "Diag_upper_Sum" by 10 and then subtract "Diag_L_Left edge" to get result to get "Diag_upper_average". |
| 1.13 | divide "Diag_lower_Sum" by 10 and then subtract "Diag_L_Left edge" to get result to get "Diag_lower_average". |
| 1.13.1 | if "Diag_upper_average" or "Diag_lower_average" are not less than 8 or nor greater than 24 sum "Diag_upper_average" and "Diag_lower_average" and divide by 2 and store as "Least_sig_5_Bits". |
| 1.14 | Otherwise flag a soft diag search error. |

| | | | | | | |
|---|---|---|---|---|---|---|
| Bit 1 | 0 | or | 1 | Determined from diagonal | | |
| Bit 2 | 0 | or | 2 | Determined from diagonal | | |
| Bit 3 | 0 | or | 4 | Determined from diagonal | | |
| Bit 4 | 0 | or | 8 | Determined from diagonal | and | LSB of bar code |
| Bit 5 | 0 | or | 16 | Determined from diagonal | and | NSB of bar code (mark =16)** |
| Bit 6 | 0 | or | 32 | | | NSB of bar code (mark >=32)*** |
| Bit 7 | 0 | or | 64 | | | NSB of bar code (mark >=32)*** |
| Bit 8 | 0 | or | 128 | | | NSB of bar code (mark >=32)*** |
| Bit 9 | O | or | 256 | | | NSB of bar code (mark >=32)*** |
| Bit 10 | 0 | or | 512 | | | NSB of bar code (mark >=32)*** |
| Bit 11 | 0 | or | 1024 | | | MSB of bar Code (no choice) **** |

*Case 1 Bit 4 not used at this time (position taken from diagonal alone)

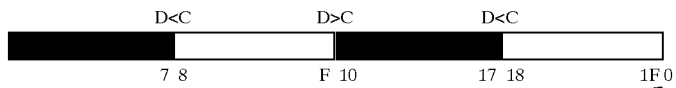

```
   D<C        D>C        D<C
  7  8       F  10     17  18      1F 0
```

WHEN MARK = 8

**Case 2 Bits 5 (mark = 16)

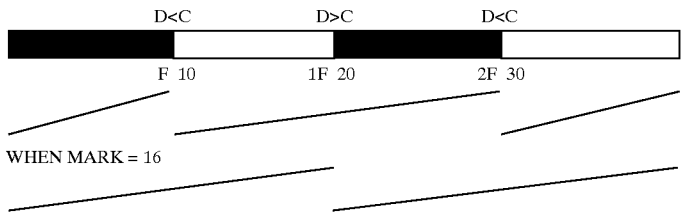

```
   D<C        D>C        D<C
  F  10      1F  20     2F  30
```

WHEN MARK = 16

***Case 3 Bits 6 and up (mark > = 32)

```
   D<C        D>C        D<C
  1F  0       1F  0      1F  0
```

WHEN MARK > 32

****Case 4 Bits 11
Bar only goes once from low to high in range 0–2048

| | |
|---|---|
| 2.01 | find msb ( bit 11 a mark has a value of 1024) (case 4) by: sum (220,442 to 220,449) save as C sum (220,450 to 220,457) save as D if both C and D are > white threshold (WT) save bit value as 0 if both C and D are < black threshold (BT) save bit as value 1 if either C or D is gray and "Least_sig_5_Bits" is <16 save as bit value 1 if either C or D is gray and "Least_sig_5_Bits" is > 16 save as bit value 0 |
| 2.02 | find Nsb ( bit 10 a mark has a value of 512) (case 3) by: sum (240,442 to 240,449) save as C sum (240,450 to 240,457) save as D if both C and D are > white threshold (WT) save bit value as 0 if both C and D are < black threshold (BT) save bit as value 1 if either C or D is gray and C > D and "Least_sig_5_Bits" is <16 save as bit value 0 |

-continued

Process Detail is as follows:

```
         if either C or D is gray and C > D and "Least_sig_5_Bits" is >16 save as bit value 1
         if either C or D is gray and C < D and "Least_sig_5_Bits" is <16 save as bit value 1
         if either C or D is gray and C < D and "Least_sig_5_Bits" is >16 save as bit value 0
  .03    find Nsb ( bit 9 a mark has a value of 256) (case 3) by:
         sum (260,442 to 260,449) save as C
         sum (260,450 to 260,457) save as D
         if both C and D are > white threshold (WT) save bit value as 0
         if both C and D are < black threshold (BT) save bit as value 1
         if either C or D is gray and C > D and "Least_sig_5_Bits" is <16 save as bit value 0
         if either C or D is gray and C > D and "Least_sig_5_Bits" is >16 save as bit value 1
         if either C or D is gray and C < D and "Least_sig_5_Bits" is <16 save as bit value 1
         if either C or D is gray and C < D and "Least_sig_5_Bits" is >16 save as bit value 0
  2.04   find Nsb ( bit 8 a mark has a value of 128) (case 3) by:
         sum (280,442 to 280,449) save as C
         sum (280,450 to 280,457) save as D
         if both C and D are > white threshold (WT) save bit value as 0
         if both C and D are < black threshold (BT) save bit as value 1
         if either C or D is gray and C > D and "Least_sig_5_Bits" is <16 save as bit value 0
         if either C or D is gray and C > D and "Least_sig_5_Bits" is >16 save as bit value 1
         if either C or D is gray and C < D and "Least_sig_5_Bits" is <16 save as bit value 1
         if either C or D is gray and C < D and "Least_sig_5_Bits" is >16 save as bit value 0
  2.05   find Nsb ( bit 7 a mark has a value of 64) (case 3) by:
         sum (300,442 to 300,449) save as C
         sum (300,450 to 300,457) save as D
         if both C and D are > white threshold (WT) save bit value as 0
         if both C and D are < black threshold (BT) save bit as value 1
         if either C or D is gray and C > D and "Least_sig_5_Bits" is <16 save as bit value 0
         if either C or D is gray and C > D and "Least_sig_5_Bits" is >16 save as bit value 1
         if either C or D is gray and C < D and "Least_sig_5_Bits" is <16 save as bit value 1
         if either C or D is gray and C < D and "Least_sig_5_Bits" is >16 save as bit value 0
  2.06   find Nsb ( bit 6 a mark has a value of 32) (case 3) by:
         sum (320,442 to 320,449) save as C
         sum (320,450 to 320,457) save as D
         if both C and D are > white threshold (WT) save bit value as 0
         if both C and D are < black threshold (BT) save bit as value 1
         if either C or D is gray and C > D and "Least_sig_5_Bits" is <16 save as bit value D
         if either C or D is gray and C > D and "Least_sig_5_Bits" is >16 save as bit value 1
         if either C or D is gray and C < D and "Least_sig_5_Bits" is <16 save as bit value 1
         if either C or D is gray and C < D and "Least_sig_5_Bits" is >16 save as bit value 0
  2.07   find Nsb ( bit 5 a mark has a value of 16) (case 2) by:
         sum (340,442 to 340,449) save as C
         sum (340,450 to 340,457) save as D
         if both C and D are > white threshold (WT) save bit value as 0
         if both C and D are < black threshold (BT) save bit as value 1
         if either C or D is gray and C > D and "Least_sig_5_Bits" is <16 save as bit value D
         if either C or D is gray and C > D and "Least_sig_5_Bits" is >16 save as bit value 1
         if either C or D is gray and C < D and "Least_sig_5_Bits" is <16 save as bit value 1
         if either C or D is gray and C < D and "Least_sig_5_Bits" is >16 save as bit value 0
  2.08   find Nsb ( bit 4 a mark has a value of 8) (case 1) by:
         Binary bar is ignored and value of bit it taken from LSB (diagonal algorithm)
```

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

What is claimed is:

1. A process for electronically capturing the attributes of the image of a fingertip which comprises:

furnishing an optical platen having a transparent scanning area and adjacent indicia imprinted thereon;

providing an electro-optical device constructed and arranged so as to receive scanned data from said platen;

scanning the fingertip by rotational movement of said fingertip across the scanning area of said platen, wherein said platen is movable and wherein said platen moves laterally past a scanner;

randomly recording segments of said scanned data during rotation of said fingertip, inclusive of the adjacent indicia;

archiving said randomly recorded segments when the quality thereof is of an acceptable level;

knitting together an integrated image of said fingertip; and extracting and reporting quality of image to trigger acceptance in a configuration menu;

whereby the absolute positioning of said recorded segments relative to said platen is defined by viewing the adjacent indicia recorded therewith.

2. A process for electronically capturing the attributes of the image of a fingertip which comprises:

furnishing an optical platen having a transparent scanning area and adjacent indicia imprinted thereon;

providing an electro-optical device constructed and arranged so as to receive scanned data from said platen;

scanning the fingertip by rotational movement of said fingertip across the scanning area of said platen, wherein said platen is movable and wherein said platen moves laterally past a scanner;

randomly recording segments of said scanned data during rotation of said fingertip, inclusive of the adjacent indicia;

archiving said randomly recorded segments when the quality thereof is of an acceptable level;

knitting together an integrated image of said fingertip; and matching and reporting quality of match to trigger acceptance in a configuration menu;

whereby the absolute positioning of said recorded segments relative to said platen is defined by viewing the adjacent indicia recorded therewith.

3. A process for creating a fingerprint record for incorporation in an automated fingerprint identification system comprising:

individually rolling the fingers of each hand across a scanning area having adjacent indicia imprinted thereon;

upon receiving an appropriate signal, placing four fingers of each hand on said scanning device whereby verification of the order of said individual fingers is verified;

and upon completion of the verification process, archiving the data collected to said automated fingerprint identification system.

4. The process according to claim 3, wherein said step of placing four fingers of each hand on said scanning device whereby verification of the order of said individual fingers is verified further comprises the step of placing an individual's thumbs on said scanning device.

* * * * *